(12) United States Patent
Rockwell

(10) Patent No.: US 7,033,488 B2
(45) Date of Patent: Apr. 25, 2006

(54) METHOD OF REMOVING AND REPLACING CATALYST IN A MULTI-REACTOR CASCADE CONFIGURATION

(75) Inventor: James L. Rockwell, Houston, TX (US)

(73) Assignee: ConocoPhillips Company, Houston, TX (US)

(*) Notice: Subject to any disclaimer, the term of this patent is extended or adjusted under 35 U.S.C. 154(b) by 254 days.

(21) Appl. No.: 10/264,426

(22) Filed: Oct. 4, 2002

(65) Prior Publication Data

US 2004/0065591 A1    Apr. 8, 2004

(51) Int. Cl.
*C10G 35/00* (2006.01)
*C10G 69/02* (2006.01)
*C10G 69/14* (2006.01)

(52) U.S. Cl. .......... 208/152; 208/49; 208/78; 208/210

(58) Field of Classification Search .......... 208/49, 208/152, 78, 210
See application file for complete search history.

(56) References Cited

U.S. PATENT DOCUMENTS

| | | | |
|---|---|---|---|
| 2,614,068 A | 10/1952 | Healey | |
| 3,470,090 A | 9/1969 | Carson | 208/138 |
| 3,725,248 A | 4/1973 | Greenwood et al. | 208/138 |
| 3,730,880 A | 5/1973 | Van der Toorn et al. | 208/213 |
| 3,809,644 A | 5/1974 | Johnson et al. | |
| 3,839,196 A | 10/1974 | Plackmann et al. | 208/174 |
| 3,839,197 A | 10/1974 | Greenwood et al. | 208/174 |
| 4,167,474 A | 9/1979 | Sikonia | 208/140 |
| 4,576,710 A * | 3/1986 | Nongbri et al. | 208/58 |
| 4,902,407 A | 2/1990 | Chan et al. | 208/152 |
| 5,198,196 A | 3/1993 | Jones, Jr. | 422/219 |
| 5,472,928 A | 12/1995 | Scheuerman et al. | 502/305 |
| 5,589,057 A | 12/1996 | Trimble et al. | 208/148 |
| 5,733,440 A | 3/1998 | Stangeland et al. | 208/148 |
| 5,925,238 A | 7/1999 | Duddy et al. | 208/210 |

OTHER PUBLICATIONS

PCT/US03/25699 International Search Report dated Nov. 1, 2004.

* cited by examiner

*Primary Examiner*—Walter D. Griffin
(74) *Attorney, Agent, or Firm*—Conley Rose P.C.

(57) ABSTRACT

A defined catalyst withdrawal and replacement program for optimizing the productivity and the economics of catalyst consumption in a multi-reactor system is disclosed. Catalyst cost is reduced by minimizing removal of the newest catalyst and maximizing removal of older catalyst to achieve an overall reduction of catalyst age in the multi-reactor system.

17 Claims, 3 Drawing Sheets

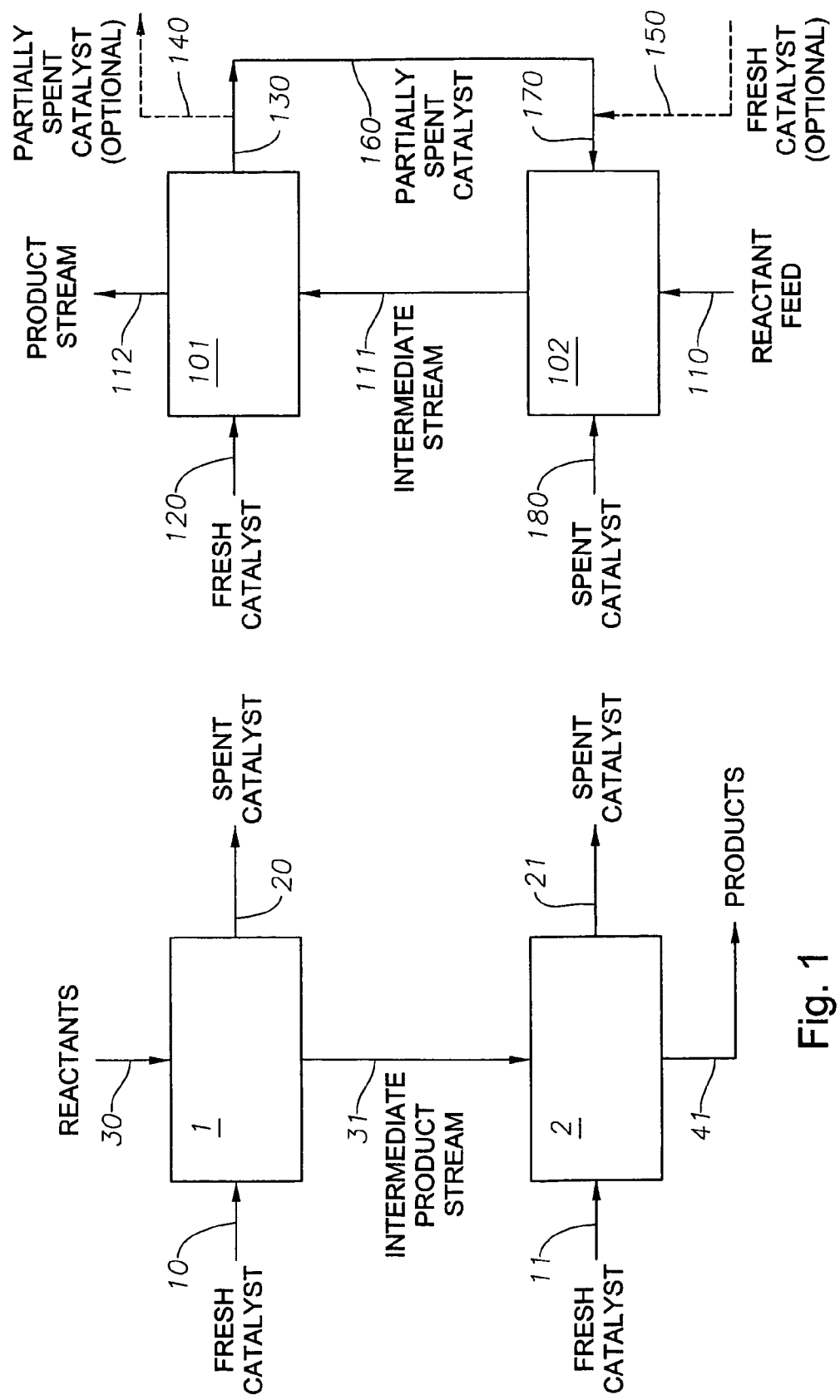

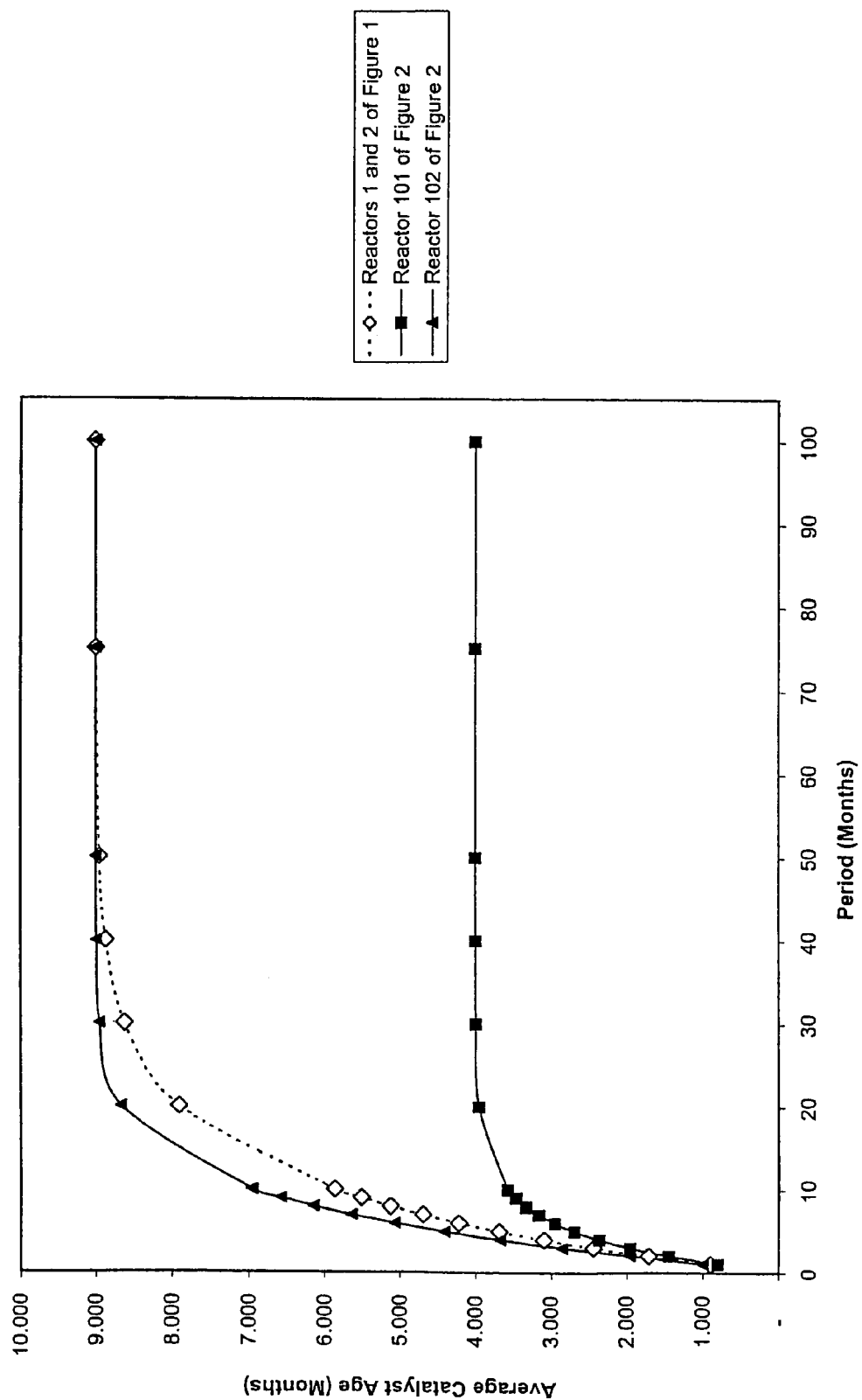

METHOD OF REMOVING AND REPLACING CATALYST IN A MULTI-REACTOR CASCADE CONFIGURATION

CROSS-REFERENCE TO RELATED APPLICATIONS

Not applicable.

BACKGROUND OF THE INVENTION

1. Field of the Invention

The present invention relates to methods of removing and replacing catalyst in a multi-reactor series. More particularly, the invention relates to such methods in which a predetermined quantity of at least partially spent catalyst is removed from the first of a plurality of reaction vessels and is introduced into a second reaction vessel, and a like amount of fresh catalyst is introduced into the first reaction vessel.

2. Description of Related Art

The use of solid catalysts in industrial catalytic reactors is well known, especially in the field of petroleum refining. Various catalytic distillation processes, fluid catalytic cracking processes, catalytic hydrocracking processes, catalytic reforming processes and catalytic hydrotreating processes, for example, are well documented in the literature. The catalysts employed in those processes have a variety of chemical compositions and take different forms, including powders or particles in fixed, moving, fluidized, or slurry beds, and porous or permeable monoliths, foams, gauzes, and the like. Depending on the requirements of a particular process, multiple catalyst beds may be employed in a single catalytic reactor, or multiple reactors may be employed in parallel and/or serial configurations, with respect to the path of the reactant and product fluids and/or gases. Regardless of the reactor configuration, over a period of time in use on stream, a catalyst typically loses part or all of its activity for catalyzing the desired chemical reaction(s). In some cases, this catalyst inactivation is due to gradual poisoning by a contaminant (e.g., sulfur, or metals) in a reactant feedstock, or by deposition of the product of an undesired side reaction (e.g., "coking"). When the efficiency or quality of the reactor output diminishes sufficiently, it becomes necessary to remove the spent catalyst and replace it with fresh catalyst in order to restore the desired level of productivity of the reactor.

A variety of catalyst removal and replacement strategies are employed conventionally. One of the simplest ways consists of halting the process after the efficiency of the reactor has deteriorated to an unacceptable level, and, if appropriate, regenerating in situ the catalyst that is retained inside the reactor column. Alternatively, the catalyst is removed and replaced. One drawback of these approaches is that the entire reactor operation must be halted during catalyst replenishment. Regeneration of the catalyst can take a considerable amount of time, causing appreciable reactor downtime and loss of productivity. Moreover, the catalyst that is removed is often only partially spent, and is replaced by fresh catalyst or routed to a regeneration system, which increases the cost of the process.

Many ways of unloading and reloading particulate catalysts without halting the progress of the process have been described in the literature. For example, in U.S. Pat. No. 5,198,196 a catalytic distillation process is described in which catalyst particles are drawn off into a separating device, regenerated in a separate system, and then returned to the reaction vessel as a slurry of fresh catalyst.

U.S. Pat. No. 3,730,880 describes a reaction vessel in which the reactants flow either co-current or counter-current to the catalyst. Fresh catalyst moves from the upper fresh catalyst introduction vessel to the upper region of the reaction vessel by periodically closing valves between the vessels. Likewise, spent catalyst is removed from the lower region of the reaction vessel into a lower catalyst disposal vessel where the spent catalyst is no longer involved in the reaction in the reaction vessel. In a counterflow system, this permits removal of catalyst from the lowermost or first stage vessel, where the raw feed stock originally contacts the catalyst.

U.S. Pat. No. 3,725,248 describes a series flow reactor system in which all reactors remain on stream during a reforming process. Each reactor contains an annular dense-phase moving bed of catalyst particles and a catalyst collector. The catalyst is processed through the reactor system counter-current to the direction of reactant flow. Fresh or regenerated catalyst is charged to the top of the reactor. A like quantity of partially spent catalyst is withdrawn from the bottom of each reactor and is added to the adjacent upstream reactor after regeneration. Thus, unlike the present invention, in which the age distribution of the particles within the reactor is substantially uniform, the age distribution in this plug-flow catalyst system is very old spent catalyst on the bottom with fresh catalyst being fed into the top. Because the catalyst is fed through the reactor linearly, in a plug-flow arrangement, it is necessary to regenerate the catalyst before introducing it to the subsequent reactors.

U.S. Pat. No. 5,733,440 describes a method for on-stream catalyst replacement during hydroprocessing of a hydrocarbon feed stream. Hydrogen gas and hydrocarbon liquid are introduced at a rate insufficient to levitate or ebulliate the catalyst bed. The substantially packed catalyst bed continually flows in a plug-like manner downwardly through the reactor vessel. Fresh catalyst is introduced at the top of the catalyst bed by laminarly flowing the catalyst in a liquid stream on a periodic or semicontinuous basis. Catalyst is similarly removed by laminarly flowing catalyst particles in a liquid stream out of the bottom of the catalyst bed. The rate at which catalyst is removed from the reaction zone, and the rate of catalyst replacement to the reaction zone, is established by a number of economic and operating factors, which include maintaining a desired average level of catalytic upgrading activity. Withdrawal of about 10–25 weight percent of the catalyst at a time from the bottom of a non-ebulliated catalyst bed, and replacement with fresh catalyst at the top of the bed, is described.

Many catalytic reactors in use today utilize ebulliated, slurry, or expanded catalyst bed reactor technology. In a hydroprocessing unit, for example, a hydrocarbon feed stream and hydrogen gas flow upwardly through a dilute phase reaction zone of catalyst in random motion. The catalyst may be replaced by continuous or periodic, onstream removal of catalyst from the reaction vessel followed by addition. Such counterflow systems have also been used because of the relative ease of withdrawing limited amounts of the ebulliated catalyst in a portion of the reacting hydrocarbon and hydrogen fluids, particularly where such turbulent flow of the catalyst is needed to assist gravity drainage through a funnel-shaped opening into a central pipe at the bottom of a vessel. According to U.S. Pat. No. 5,472,928 catalyst replacement rates for ebulliated bed reactors are based on maintaining catalyst equilibrium conditions necessary to maintain processing objectives. Difficulties with respect to withdrawal of expended catalyst occur due to commingling of fresh or partially expended catalyst with expended catalyst withdrawn from the bottom of the catalyst bed in ebulliated bed systems.

U.S. Pat. No. 4,902,407 describes a method of controlling catalyst inventory in an ebulliated bed process for treating hydrocarbon liquids with hydrogen. Pressure differentials are measured to calculate a catalyst inventory characterization factor. Aged catalyst is withdrawn and fresh catalyst added in an amount to reestablish the value of the factor and to maintain the desired catalyst to oil ratio.

U.S. Pat. No. 3,470,090 describes a method of operating a non-regenerative fixed bed reforming process. A multiple fixed-bed reactor system is illustrated in which the catalyst moves down through the reactor in a plug-flow system. The spent catalyst is removed from the bottom and fresh catalyst is added to the top simultaneously to each of the reactors, either continuously or periodically, using a lock hopper system or a screw conveyor system. U.S. Pat. No. 4,167,474 suggests modifying that method to the extent that the catalyst particles withdrawn from a given reaction zone are transported to the next succeeding reaction zone, while the catalyst withdrawn from the last reaction zone may be transported to a suitable regeneration facility, as illustrated in U.S. Pat. Nos. 3,839,197 and 3,839,196.

U.S. Pat. No. 5,589,057 describes a method for extending the life of a hydroprocessing catalyst. The catalyst bed continually flows in a plug-like manner downwardly through a single reactor vessel, and catalyst is removed on a periodic or semicontinuous basis by laminarly flowing catalyst particles in a liquid stream out of the bottom of the catalyst bed. The high-activity less dense fraction of catalytic particulates are separated out of the removed catalyst and are subsequently mixed with fresh catalyst and returned to the reactor vessel.

U.S. Pat. No. 5,925,238 describes a catalytic multi-stage hydrodesulfurization process with cascading rejuvenated catalyst. Used catalyst having a certain catalyst equilibrium age is withdrawn from the second stage reactor, rejuvenated, and then cascaded forward and added to the first stage reactor. Sufficient fresh make-up catalyst is added to the second stage reactor to replace the used catalyst withdrawn there, and only sufficient fresh catalyst is added to the first stage reactor to replace any catalyst transfer losses.

A drawback of most present day catalyst replacement regimes is that they fail to adequately conserve the amount of new or fresh catalyst that is consumed in the overall operation. This is especially problematic in slurry bubble or fluidized bed reactors, which typically employ higher reactant flow rates and space velocities, and use smaller, more highly active catalyst beds than their fixed bed or plug-flow counterpart reactors. While the fouled or spent catalyst can usually be expected to concentrate in the fixed bed region that first contacts the reactant fluids or gases, and can be selectively removed by a counterflow catalyst removal system, this is not possible with slurry bubble fluidized catalyst beds. Typically, in a slurry bubble fluidized bed reactor, when spent catalyst is frequently or continuously removed from a process and replaced with new catalyst, in order to maintain high efficiency of operation, the withdrawn catalyst ranges in age from brand new to very old catalyst. In existing slurry bubble or fluidized bed catalytic processes, oftentimes more fresh catalyst is added to the catalytic reactor than is really necessary in order to maintain an acceptable level of process performance. What is needed is a way to optimize the catalyst withdrawal and replacement program in a serial multi-reactor catalytic process to reduce the amount of expensive catalyst consumed over the run period while maintaining an acceptable catalyst age profile. It is also desirable in some instances to minimize the catalyst age profile while also reducing the amount of catalyst used.

SUMMARY OF THE INVENTION

The present invention diminishes the frequency of costly catalyst replacement in a multi-reactor cascade configuration (i.e., series rather than parallel arrangement) to maintain a given catalyst age profile. Catalyst cost is reduced by decreasing removal of the newest catalyst and increasing removal of older catalyst. By increasing the efficiency of use of catalyst in a serial multi-reactor catalytic process, under conditions conducive to obtaining the desired level of catalytic activity, catalyst renewal can be reduced compared to conventional catalyst replacement regimes.

In accordance with one aspect of the present invention, a method of reducing overall catalyst age and reducing catalyst volume requirements in a multi-reactor cascade configuration (i.e., series rather than parallel arrangement) is provided.

Still other embodiments and advantages of the present invention will appear from the following description.

BRIEF DESCRIPTION OF THE DRAWINGS

FIG. 1 is a schematic diagram showing a conventional one-pass catalyst replacement/removal program in a two reactor series reactant flow arrangement.

FIG. 2 is a schematic flow diagram showing two reactors operating in series reactant flow configuration according to one embodiment of the present invention.

FIG. 3 is a graph comparing the performance of the prior art reactors of FIG. 1 with the embodiment of the present invention shown in FIG. 2.

DETAILED DESCRIPTION OF PREFERRED EMBODIMENTS

Figure 4:
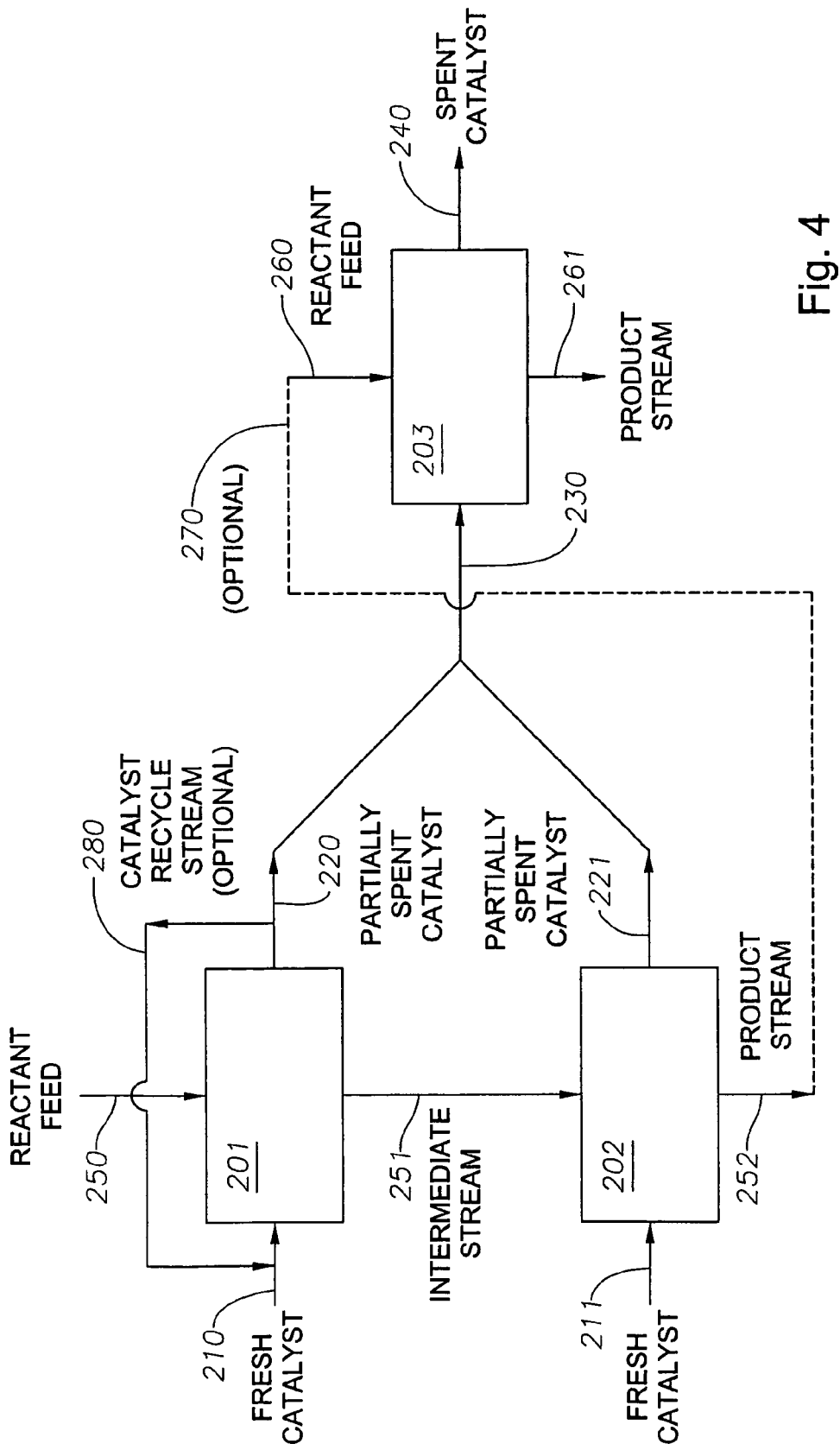
FIG. 4 is a schematic embodiment of the present invention showing two parallel reaction systems having a serial catalyst replenishment system in accordance with an embodiment of the present invention.

To optimize both the productivity and the economics of a catalytic process carried out inside a series of catalytic reactors, a defined program of catalyst withdrawal and replacement has been devised. The program offers an improvement over conventional catalyst replacement methods, especially in a series of multiphase slurry bubble or fluidized bed catalytic reactors where the age distribution of the catalyst particles is substantially uniform. By way of illustration only, as in FIG. 1, a multi-reactor series comprising two or more reactors and catalyst recycling, replacement, or replenishment means is employed. The reactors are configured for serial reactant flow from one reactor to the next. The same kind of catalyst is employed in the reaction zone of each reactor. Each reaction vessel and catalyst replacement means can be similar to that described in U.S. Pat. No. 5,733,440, the disclosure of which is incorporated herein by reference. The catalyst may operate as a fixed, ebulliated, slurry bubble, or fluidized bed within each reactor or any other type of bed which has a substantially uniform distribution and which is well known in the art. Preferably the catalyst is fluidized and is recirculated.

A conventional catalyst replacement regime is illustrated in FIG. 1 for two catalytic reactors 1 and 2 arranged in series.

For the purposes of these examples, each reactor employs the same kind and amount of catalyst and the catalyst of each reactor is in the form of a slurry of homogeneously mixed particles. The reactant stream flows serially from reaction zone to reaction zone of the reactors. According to this "single pass" regime, 10 weight percent per reactor per month of the catalyst is removed from each of the reactors and is replaced with fresh catalyst. Typically the withdrawn catalyst consists of an aged-distributed population of catalyst particles and a portion of the newly added catalyst particles. The average catalyst age for each reactor of this regime can be calculated using the following equation (1):

$$A_R = \frac{1-(1-x)^{n+1}}{x} - 1 \quad (1)$$

where $A_R$=average catalyst age of reactor R; x=the fraction of catalyst removed and replaced per period (e.g., month); and n=the number of periods (e.g., months) since reactor R was charged with fresh catalyst. At a replacement/removal rate of 10% per reactor per month, it is easily calculated that the catalyst age in both reactors 1 and 2 stabilizes at about 9 months over a 100 month processing run, as is shown in FIG. 3 (open blocks).

Particularly, fresh catalyst feed 10 flowing at a rate of 10% per month of the total weight of the catalyst of reactor 1 replenishes the catalyst of reactor 1. The catalyst of reactor 1 catalyzes the reaction of the reactants fed into reactor 1 through reactant feed 30. The reacted reactants exit reactor 1 as intermediate product stream 31. Spent catalyst effluent 20 exists reactor 1 at the same rate as fresh catalyst feed 10. As calculated above, the average age of the catalyst in reactor 1 stabilizes at about 9 months.

Reactor 2 of FIG. 1 operates almost identically to reactor 1. Just as in reactor 1, fresh catalyst feed 11 refreshes the catalyst of reactor 2 at a rate of 10% per month. The catalyst of reactor 2 catalyzes the reaction of intermediate product stream 31 which then exits reactor 2 as product stream 41. The spent catalyst exits reactor 2 as spent catalyst stream 21. As with reactor 1, the average age of the catalyst in reactor 2 eventually stabilizes at around 9 months. Thus, in the catalyst system of FIG. 1, a replenishment rate of 10% of the catalyst weight of each reactor 1 and 2 (which is equal to 20% of the catalyst weight of a single reactor) eventually results in two reactors with an average catalyst age of 9 months.

FIG. 2 is a schematic flow diagram of an embodiment of the present invention showing two reactors operating in series similar to those of FIG. 1. In this case, however, approximately 20% of the catalyst is continuously removed from the first reactor per period (e.g., month) and replaced with an equal amount of fresh catalyst. The reactor scheme of FIG. 2 is preferred in circumstances in which the first reactor (e.g., reactor 101) has a typically greater kinetic rate than the second (e.g., reactor 102). In contrast, in reaction schemes in which contaminants or particulates are present in the reactant feed, it is preferred to feed fresh catalyst to any reactor other than the reactor which initially takes in the reactant feed.

By way of example only, in an embodiment of the present invention as shown in FIG. 2, the fresh catalyst feed stream 120 enters reactor 101 at a rate of 20% per month of the total catalyst weight of reactor 101. The catalyst in reactor 101 has a substantially uniform age distribution and catalyzes the reaction of intermediate stream 111 from reactor 102 which is flowing counter-current to the overall flow of the catalyst flow. It will be appreciated by one of skill in the art that it is not critical whether the reactant flow is co-current or counter-current to the overall catalyst flow. After it is reacted in reactor 101, intermediate stream 111 exits reactor 101 as product stream 112. A portion of the catalyst substantially equal in size to that introduced in fresh catalyst feed stream 120 exits reactor 101 as partially spent catalyst stream 130. If desired, a slip stream 140 of a portion of the partially spent catalyst stream 130 may optionally be removed from partially spent catalyst stream 130. If partially spent catalyst is removed through slip stream 140, in this example, an equal amount of fresh catalyst is introduced in intermediate fresh catalyst feed 150 before the catalyst is fed into reactor 102 as intermediate catalyst feed 170.

In reactor 102 the catalyst catalyzes the reaction of the reactant feed 110 which exits reactor 102 as intermediate stream 111. The catalyst in reactor 102 has a substantially uniform age distribution and a portion of the catalyst substantially equal in size to the intermediate fresh catalyst feed 170 exits reactor 102 as spent in catalyst stream 180.

In a preferred arrangement, the catalyst removed from reactor 101 is used to replace the catalyst removed from reactor 102. The catalyst withdrawn from reactor 101 is preferably fed, together with the reactant liquid(s) and/or gas(es), directly into the reaction zone of reactor 102. This second use of the partially spent catalyst fraction catalyst fraction from reactor 101 by a subsequent reactor in the series is termed a "second pass" of the catalyst. Optionally, the partially spent catalyst may be collected and separated from the fluidizing fluid(s) and/or gas(es) and then introduced into reactor 102 as a slurry, together with a reactant fluid/gas. The used or spent catalyst removed from reactor 102 is discarded, recycled or regenerated, as appropriate, depending on the nature of the catalyst and the requirements of the particular process in order to maintain a uniform level of overall productivity. The withdrawn catalyst, which is mixed with a portion of the reactant fluids or gases, can be separated from the carrier fluids or gases, by a catalyst collector, if desired. After the initial withdrawal and replacement steps from each of the reactors, the subsequently withdrawn catalyst is made up of catalyst of differing ages and specific activities.

Although the total catalyst inventory of reactor 101 (X) and that of reactor 102 (Y) are not necessarily the same for every type of reactor or process, the amount of catalyst removed and replaced (i.e., nX, where n is <1) according to this method is preferably the same. For ease of demonstration, X=Y in the present examples.

Depending on the characteristics and limitations of the particular process carried out in the reactors, the first reactor may be the first, intermediate or last reactor in the multi-reactor series, with respect to initial contact with the reactant gas stream. For example, if certain particulates or other contaminants are carried by the reactant feedstock and the first contacted catalyst is therefore rendered especially prone to fouling upon early contact with the reactant feed, it is preferable not to choose that reactor as the first reactor; thus, the second reactor receives the new catalyst.

Referring now to FIG. 3, there is shown a graph comparing the average catalyst age of the reactors of FIG. 1 with the average catalyst age of the reactors of FIG. 2. It is seen that using an equivalent amount of catalyst as that of FIG. 1 (e.g., 20% of the catalyst of a single reactor), the average catalyst age decreases substantially in the reaction of FIG. 2. Particularly, it is seen that after about 50 months, the average age of the catalyst in reactors 1 and 2 of FIG. 1 stabilize at about 9 months, whereas the average age of reactor 101 of FIG. 2 stabilizes to about 4 months while the average catalyst age of reactor 2 stabilizes at about 9 months, no higher at equilibrium than the equilibrium average age of both reactors of FIG. 1. Thus, using the embodiment of the present invention shown in FIG. 2 leads to one reactor with substantially fresher catalyst and a second reactor with an equilibrium age of no older than that of both reactors of FIG. 1. Although the reactors 1 and 2 of FIG. 1 reach equilibrium faster than reactor 102 of FIG. 2, in the long run, the difference is not substantial, and is more than outweighed by the substantially younger catalyst in reactor 101 of FIG. 2.

Also as can be inferred from FIG. 3, the average catalyst age of both reactors of FIG. 1 at equilibrium is 9 months [(9+9)/2=9]. While the average catalyst age of both reactors in FIG. 2 at equilibrium is 6.5 months [(9+4)/2=6.5]. Thus, if it is desired to have the average of both reactors of FIG. 2 equal to the reactors of FIG. 1, less fresh catalyst will be needed, and one of ordinary skill in the art can adjust the amount of fresh catalyst added such that the average catalyst particle age of the reactors of FIG. 2 at equilibrium is equal to 9 months (or whatever other average equilibrium age is desired).

Referring now to FIG. 4, there is shown an embodiment of the present invention in which two reactions are running in parallel, one a serial reaction through reactors 201 and 202 and another reaction through reactor 203, whereas the catalyst replenishment system is running in series. The reactions occurring in reactors 201, 202, and 203 are not necessarily, but can be, the same type of reaction.

With respect to the catalyst system of FIG. 4, fresh catalyst is fed into reactor 201 as fresh catalyst feed 210 at a rate which can be determined by one of ordinary skill in the art based upon the specific properties of the catalyst being used, the reaction which it is catalyzing, and other factors normally relied upon by those of skill in the art. Before being fed into reactor 201, the fresh catalyst stream may optionally be combined with a catalyst recycle stream 280 which is recycled from the partially spent catalyst stream 220. It will be appreciated by one of ordinary skill in the art that, if desired, a recycle stream may be added to any reactor. As with the fresh catalyst feed, the rate of catalyst recycle, if any, will be determined by one of ordinary skill in the art based upon the relevant conditions.

While in reactor 201, the catalyst, having a substantially uniform age distribution, catalyzes the reaction of reactant feed 250 which exits reactor 201 as intermediate stream 251 which is then fed to reactor 202. While in reactor 202, the intermediate stream is catalyzed into product stream 252. The fresh catalyst of reactor 202 is fed in through fresh catalyst feed 211 at a rate to be determined by one of ordinary skill in the art based upon the properties of the catalyst and the reactor and any other factors as may be relied upon by one of skill in the art.

After catalyzing the respective reactions, a portion of the catalyst of each reactor equal to the portion charged through fresh catalyst feeds 210 and 211 respectively is discharge as partially spent catalyst streams 220 and 221. The partially spent catalyst streams 220 and 221 are then fed into reactor 203 as intermediate catalyst feed 230. It will be appreciated by one of skill in the art that the two partially spent catalyst streams 220 and 221 do not necessarily need to be combined before feeding into reactor 203. The partially spent catalyst is then fed into 203 where it catalyzed the reaction of reactant feed 260 to produce product stream 261. Reactant feed 260 optionally comprises at least a portion of product stream 252 sent via stream 270. Spent catalyst is then discharged from reactor 203 as spent catalyst stream 240 at preferably substantially the same rate as it is fed in through intermediate catalyst feed 230.

"Fresh catalyst" as used herein shall be defined to include not only new or freshly manufactured catalyst, but also includes may catalyst that is relatively fresher than the catalyst in the reactor into which the fresh catalyst is being charged, whether it be new, rejuvenated, recycled, or produced by any other means. When fresh catalyst as herein defined is added in more than one place in any give reaction scheme, such as streams 120 and 150 of FIG. 2 or streams 210 and 211 of FIG. 4, it is not necessary that the fresh catalyst be the same fresh catalyst, either in kind or freshness. The kind and freshness of any given catalyst added to a reaction scheme in accordance with the present invention can easily be determined by one of ordinary skill in the art depending on the desired reaction and reactor conditions.

Likewise, when spent catalyst or partially spent catalyst is discharged from two separate places in a reactor scheme (e.g., streams 130 and 180 of FIG. 2 or streams 220 and 221 of FIG. 4), it is not necessary that the streams are of either the same composition, age, or relative catalytic activity or different composition, age, or relative catalytic activity (i.e., each partially spent or spent catalyst stream may have its own properties, independent of the properties of other spent or partially spent catalyst streams). In addition, the term "spent catalyst" does not necessarily indicate that the catalyst has lost all of its catalytic activity.

The "equilibrium age" of the catalyst in a reactor is the age at which the removal of partially spent catalyst and its replacement with fresh catalyst does not substantially change the average age of the catalyst in the reactor (e.g., when the graph of the average catalyst age becomes substantially asymptotic).

The "average equilibrium age" of a plurality of reactors is the weighted mean equilibrium age of all reactors in the plurality.

The phrase "substantially uniform age distribution" means that the catalyst particles are thoroughly mixed such that any sample of the catalyst taken from any region of the reactor bed will have a substantially equivalent average particle age as any other sample, and the bed as a whole, when taken at the same time.

When one reactor is said to be "upstream" or "downstream" from another, that refers to the relative position of one reactor to another with respect to the reactant flow irrespective of the direction of the catalyst flow. By way of example, reactor 101 of FIG. 2 is downstream of reactor 102 of FIG. 2 because the reactants flow from reactor 102 to reactor 101, even though the catalyst flows from reactor 101 to reactor 102. Similarly, two reactors are in parallel if they react different reactant streams, regardless of the direction of the catalyst flow. By way of example, reactors 201 and 203 of FIG. 4 are in parallel even though the catalyst flows from reactor 201 to reactor 203.

It will be understood to one of ordinary skill in the art that the term "different reactant streams" does not necessarily mean that the reactant streams are different in composition, only that they are a physically different stream. "Different streams" may have identical composition, and indeed come from a common source. For example, streams 250 and 260 of FIG. 4 may be the same or different composition and come from the same or different sources even though they are "different reactant streams."

It should be noted that the catalyst feed streams of the present invention may be fed to and removed from the reactors in any way which is advantageous for the particular type of catalyst and type of reactor which is being used. Particularly, it will be understood that the catalyst could be fed and removed from the reactor in discrete batches at regular or irregular intervals (such as once per day or when a given catalyst property reaches a certain level) or as a continuous of semi-continuous stream. Thus, the exact method of adding and removing catalyst from the reactors is not critical to the present invention and may be determined by one of ordinary skill in the art based on specific reactor and catalyst properties and conditions.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, although the replacement of catalyst in a series of catalytic reactors is described herein, it should be understood that the methods are also applicable for the conservative replacement of materials in a plurality of processing vessels, wherein the materials have properties other than or in addition to catalytic properties. Such materials might include a material that initially has a given property and which loses at least a portion of that property during a process carried out in the serial vessels such as size-critical materials which diminish in size. Although the above-described examples and Figures focus on catalyst removal and replacement in a series of slurry and fluidized bed reactors, it should also be understood that catalyst withdrawal and replacement regimens can also be advantageously applied to multiphased, fixed bed, moving bed, ebulliated bed or even stacked monolith catalyst bed multi-reactors by appropriately modifying the procedure. For example, in the case of a stacked monolith bed, the process would need to be briefly shut down during catalyst removal and replacement. Accordingly, the scope of protection is not limited by the description set out above.

The disclosures of all patents and publications cited herein are incorporated by reference in their entirety. Should the disclosure of any of the patents and publications that are incorporated herein by reference conflict with the present specification to the extent that it might render a term unclear, the present specification shall take precedence.

What is claimed is:

1. A method of decreasing the average equilibrium age of catalyst in a multi-reactor system comprising:
    placing an amount (X) of a fresh catalyst into a first reactor;
    placing an amount (Y) of a fresh catalyst into a second reactor;
    placing an amount (Z) of a fresh catalyst into a third reactor, wherein the third reactor is in parallel with the first reactor;
    operating the first, second, and third reactors to catalyze first, second, and third respective reactions of reactants to products, wherein the first, second, and third reactions create partially spent catalyst having a substantially uniform age distribution;
    withdrawing from the first reactor a portion of the partially spent catalyst (xX), wherein x is <1;
    replacing the portion of the partially spent catalyst withdrawn from the first reactor with a substantially equivalent amount of fresh catalyst;
    withdrawing from the third reactor a portion of the partially spent catalyst (zZ), wherein z is <1;
    replacing the portion of the partially spent catalyst withdrawn from the third reactor with a substantially equivalent amount of fresh catalyst;
    withdrawing from the second reactor a portion of the partially spent catalyst (yY), wherein y is <1 and wherein yY≦(xX+zZ); and
    replacing the withdrawn partially spent catalyst from the second reactor with a substantially equivalent amount of partially spent catalyst from the portion withdrawn from the first and third reactors.

2. The method of claim 1 wherein the first and third reactors are upstream from the second reactor.

3. The method of claim 1 wherein the second reactor is upstream from the first and third reactors.

4. The method of claim 1 wherein at least a portion the partially spent catalyst removed from at least one of the reactors is recycled back into the at least one reactor.

5. The method of claim 1 wherein the catalysts are fluidized particulate catalysts.

6. The method of claim 1 wherein yY<xX and further comprising rejuvenating, recycling, or discarding the excess of xX−yY.

7. The method of claim 1 wherein X is substantially equal to Y.

8. The method of claim 1 wherein X and Y are substantially unequal.

9. The method of claim 1 wherein the first reactor is upstream from the second reactor.

10. The method of claim 1 wherein the second reactor is upstream from the first reactor.

11. The method of claim 1 further comprising regenerating, refreshing, or rejuvenating the catalyst withdrawn from the second reactor.

12. The method of claim 1, further comprising shutting down the reactors during catalyst withdrawal and replacement.

13. The method of claim 1, further comprising replacing the catalyst withdrawn from the second reactor with partially spent catalyst withdrawn from the first and third reactors at a rate such that a predetermined overall level of catalytic activity in the series of reactors is maintained.

14. The method of claim 1, further comprising conducting the withdrawing and replacing steps substantially continuously.

15. The method of claim 1, further comprising, after either withdrawing step, separating the withdrawn catalyst from the reactants, or products, or both.

16. The method of claim 1, further comprising continually operating the series of reactors during the withdrawing and adding of used or fresh catalyst.

17. The method of claim 1, further comprising monitoring at least one reaction parameter such that a decrease in catalytic activity below a predetermined threshold level of activity is detectable.

* * * * *